(12) United States Patent
Lai et al.

(10) Patent No.: US 8,692,396 B1
(45) Date of Patent: Apr. 8, 2014

(54) APPARATUS AND METHOD FOR A HYBRID SYSTEM FOR HARVESTING MAGNETIC AND ELECTRICAL ENERGY

(75) Inventors: William W. Lai, Ridgecrest, CA (US); Alfred J. Baca, Ridgecrest, CA (US); M. Joseph Roberts, Ridgecrest, CA (US); Lawrence C. Baldwin, Ridgecrest, CA (US); Michael T. Owens, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 191 days.

(21) Appl. No.: 13/495,278

(22) Filed: Jun. 13, 2012

(51) Int. Cl.
| F02B 63/04 | (2006.01) |
| F03G 7/08 | (2006.01) |
| H02K 7/18 | (2006.01) |
| F03B 13/00 | (2006.01) |
| H02P 9/04 | (2006.01) |
| A43B 13/20 | (2006.01) |
| H02K 7/00 | (2006.01) |

(52) U.S. Cl.
USPC ........ 290/1 R; 290/54; 36/29; 36/88; 310/17; 310/30

(58) Field of Classification Search
USPC ................ 290/1 R, 54; 36/29, 88; 310/17, 30
See application file for complete search history.

(56) References Cited

U.S. PATENT DOCUMENTS

| 5,167,082 | A | * | 12/1992 | Chen | 36/2.6 |
| 5,347,186 | A | * | 9/1994 | Konotchick | 310/17 |
| 5,495,682 | A | * | 3/1996 | Chen | 36/2.6 |
| 5,818,132 | A | * | 10/1998 | Konotchick | 310/17 |
| 5,860,727 | A | * | 1/1999 | Chien | 362/84 |
| 5,918,381 | A | * | 7/1999 | Landry | 36/3 B |
| 6,182,378 | B1 | * | 2/2001 | Sendaula | 36/29 |
| 6,201,314 | B1 | * | 3/2001 | Landry | 290/54 |
| 6,220,719 | B1 | * | 4/2001 | Vetorino et al. | 362/192 |
| 6,239,501 | B1 | * | 5/2001 | Komarechka | 290/1 R |
| 6,255,799 | B1 | * | 7/2001 | Le et al. | 320/107 |
| 6,281,594 | B1 | * | 8/2001 | Sarich | 290/1 R |
| 6,744,145 | B2 | * | 6/2004 | Chang | 290/1 R |
| 6,768,230 | B2 | * | 7/2004 | Cheung et al. | 310/30 |
| 6,798,090 | B2 | * | 9/2004 | Cheung et al. | 310/17 |
| 6,809,427 | B2 | * | 10/2004 | Cheung et al. | 290/1 R |
| 6,812,583 | B2 | * | 11/2004 | Cheung et al. | 290/1 R |
| 6,812,598 | B2 | * | 11/2004 | Cheung et al. | 310/30 |
| 6,861,772 | B2 | * | 3/2005 | Cheung et al. | 310/30 |
| 6,865,825 | B2 | * | 3/2005 | Bailey et al. | 36/88 |
| 6,936,937 | B2 | * | 8/2005 | Tu et al. | 310/12.12 |
| 7,009,310 | B2 | * | 3/2006 | Cheung et al. | 290/1 R |
| 7,107,706 | B1 | * | 9/2006 | Bailey et al. | 36/88 |
| 7,148,583 | B1 | * | 12/2006 | Shau et al. | 290/1 R |
| 7,204,041 | B1 | * | 4/2007 | Bailey et al. | 36/29 |
| 7,219,449 | B1 | * | 5/2007 | Hoffberg et al. | 36/88 |
| 7,288,860 | B2 | * | 10/2007 | Cheung et al. | 310/12.12 |
| 7,309,934 | B2 | * | 12/2007 | Tu et al. | 310/12.12 |
| 7,327,046 | B2 | * | 2/2008 | Biamonte | 290/1 R |

(Continued)

Primary Examiner — Pedro J Cuevas
(74) Attorney, Agent, or Firm — James M. Saunders

(57) ABSTRACT

A hybrid system for harvesting magnetic and electrical energy includes a substrate, at least one permanent magnet, and at least one coil of wire equal in number to the permanent magnet. Each permanent magnet is configured to fit in the substrate. Each coil of wire is configured to fit circumferentially around a respective permanent magnet. Each coil of wire is configured to fit in the substrate.

18 Claims, 3 Drawing Sheets

(56) References Cited

U.S. PATENT DOCUMENTS

| | | | |
|---|---|---|---|
| 7,362,003 B2* | 4/2008 | Stewart et al. | 290/42 |
| 7,395,614 B1* | 7/2008 | Bailey et al. | 36/28 |
| 7,431,474 B2* | 10/2008 | Mah | 362/192 |
| 7,498,682 B2* | 3/2009 | Lemieux | 290/1 R |
| 7,692,320 B2* | 4/2010 | Lemieux | 290/1 R |
| RE41,626 E* | 9/2010 | Cheung et al. | 310/30 |
| 7,952,238 B2* | 5/2011 | Tu et al. | 310/12.24 |
| 7,956,476 B2* | 6/2011 | Yang | 290/1 R |
| 7,989,971 B2* | 8/2011 | Lemieux | 290/1 R |
| 2003/0155771 A1* | 8/2003 | Cheung et al. | 290/1 R |
| 2003/0197433 A1* | 10/2003 | Cheung et al. | 310/14 |
| 2004/0155467 A1* | 8/2004 | Cheung et al. | 290/1 R |
| 2012/0260522 A1* | 10/2012 | Shi et al. | 36/2.6 |
| 2012/0260531 A1* | 10/2012 | Shi et al. | 36/102 |
| 2013/0033042 A1* | 2/2013 | Fortier et al. | 290/54 |

* cited by examiner

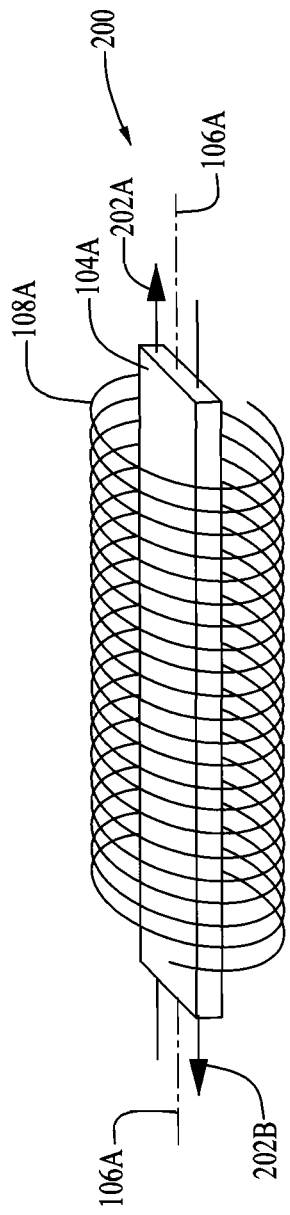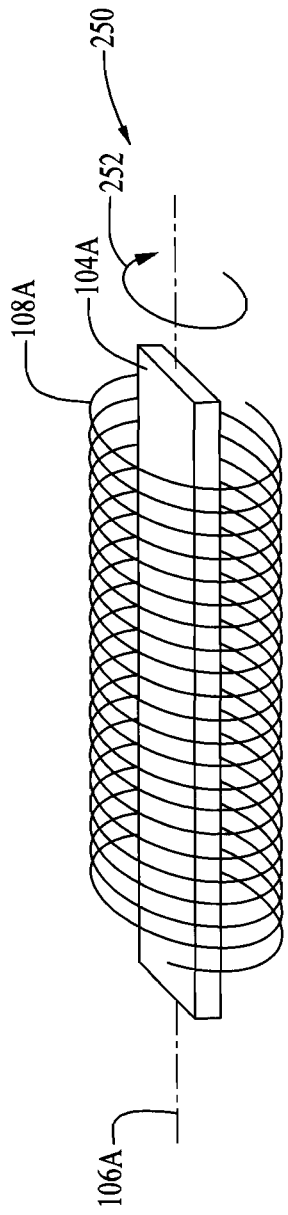

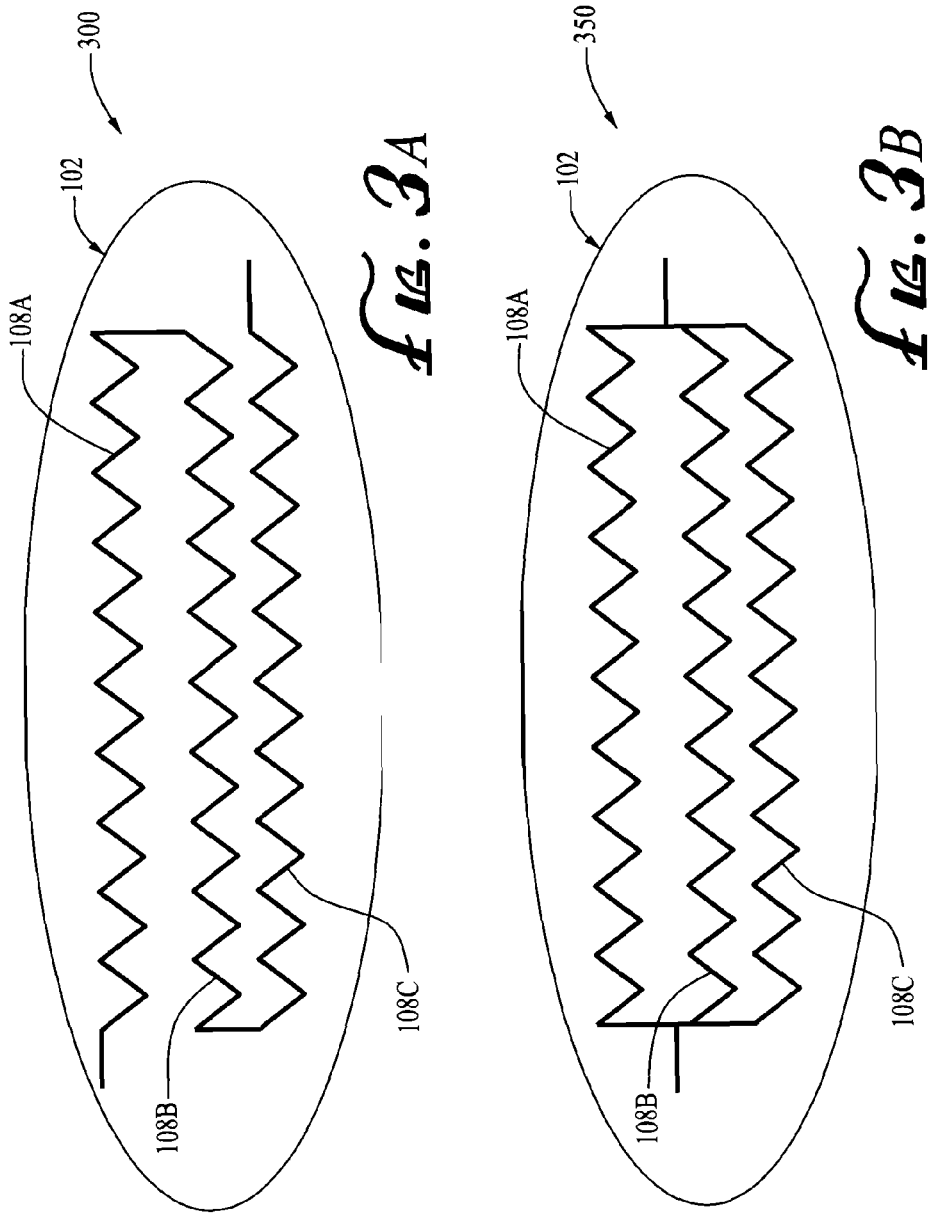

APPARATUS AND METHOD FOR A HYBRID SYSTEM FOR HARVESTING MAGNETIC AND ELECTRICAL ENERGY

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to energy harvesting, and more particularly, to an apparatus and method for harvesting magnetic and electrical energy.

BRIEF DESCRIPTION OF THE DRAWINGS

FIG. 2A is an elevation view of a solenoid and a laterally moving permanent magnet, according to embodiments of the invention.

FIG. 2B is an elevation view of a solenoid and a rotating permanent magnet, according to embodiments of the invention.

FIG. 3A is a plan view of a hybrid system for harvesting magnetic and electrical energy with solenoids connected in series, according to embodiments of the invention.

FIG. 3B is a plan view of a hybrid system for harvesting magnetic and electrical energy with solenoids connected in parallel, according to embodiments of the invention.

Figure 1:
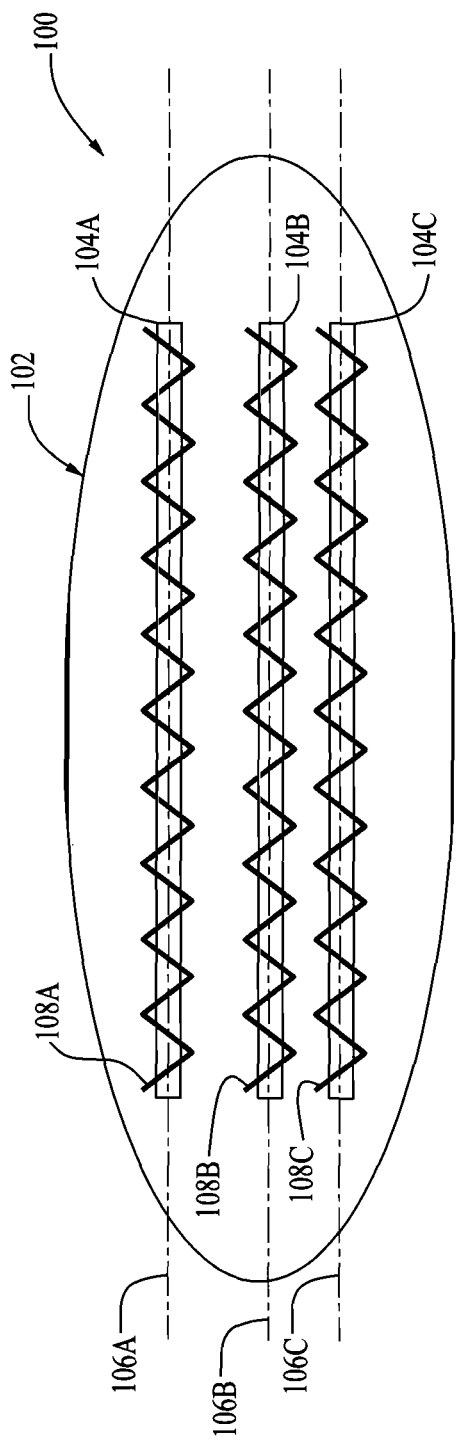
FIG. 1 is a plan view of a hybrid system for harvesting magnetic and electrical energy, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to energy harvesting, and more particularly, to an apparatus and method for harvesting magnetic and electrical energy. The average person takes between five and seven thousand steps each day. The ability to harvest energy from each step, however small, can result in a substantial total daily value. In turn, this can then be readily applied to personal communications equipment and other devices having low energy requirements.

There have been many attempts to harvest the energy resulting from compression and decompression of heel strikes. Although this is an emerging technology, the amount of energy collected is severely limited by the displacement of the compression/decompression distance. When incorporated into a shoe, this would result in a displacement range between five and ten cm. Any more than that would result in an abnormal change in the normal gait of a person. The result of which would offset any additional energy collection by increased fatigue or abnormal wear and tear on joints.

The limitations of energy harvesting by mechanical means can be avoided by using a system that can multiply the effects of each small displacement. Harvesting energy by way of magnetic induction is one such way of multiplying the effective distance that is displaced with each step. Another benefit of using magnetic induction for energy harvesting is the device can make use of both moving and non-moving parts of a shoe, which allows the entire sole to be used as an energy harvester.

Although embodiments of the invention are described in considerable detail, including references to certain versions thereof, other versions are possible. Examples of other versions include performing alternate combinations and sequencing of the materials to enhance energy harvesting based on application-specific conditions. Therefore, the spirit and scope of the appended claims should not be limited to the description of versions included herein.

In the accompanying drawings, like reference numbers indicate like elements. FIG. 1 illustrates a plan view of a hybrid system for harvesting magnetic and electrical energy, according to embodiments of the invention. Reference character 100 depicts an apparatus of embodiments of the invention. For ease of viewing, FIG. 1 does not depict specific component connections and orientations. Specific component connections and orientations are discussed (and shown in additional figures) below.

Components may exist singularly or in pluralities, even though depicted as one or the other in the figures for simplified viewing, without detracting from the merits or generality of embodiments of the invention.

Referring to FIG. 1, embodiments of the invention generally relate to an energy harvesting device, including: a substrate 102. At least one permanent magnet 104A, B, and C is configured to fit in the substrate 102. Each permanent magnet 104A, B, and C has a central longitudinal axis 106A, B, and C.

At least one coil of wire 108A, B, and C equal in number to the permanent magnets 104A, B, and C is provided. Each coil of wire 108A, B, and C is configured to fit circumferentially around each respective permanent magnet 104A, B, and C. Each coil of wire 108A, B, and C is configured to fit in the substrate 102.

Another embodiment of the invention generally relates to a method of making an energy harvesting device, including: providing a substrate 102. At least one permanent magnet 104A, B, and C is provided. Each permanent magnet 104A, B, and C has a central longitudinal axis 106A, B, and C. At least one coil of wire 108A, B, and C is provided. The coil of wire 108A, B, and C is equal in number to the permanent magnet 104A, B, and C. Each coil of wire 108A, B, and C is configured to fit circumferentially around each respective permanent magnet 104A, B, and C. Each coil of wire 108A, B, and C is configured to fit in the substrate 102.

A fabricator positions and attaches each permanent magnet 104A, B, and C in the substrate 102. The fabricator circumferentially fits each coil of wire 108A, B, and C around each respective permanent magnet 104A, B, and C and attaches each coil of wire 108A, B, and C to the substrate 102.

FIG. 2A is an elevation view of a solenoid and a laterally moving permanent magnet, according to embodiments of the invention and is depicted as reference character 200. FIG. 2B is an elevation view of a solenoid and a rotating permanent magnet, according to embodiments of the invention and is depicted as reference character 250.

FIG. 3A is a plan view of a hybrid system for harvesting magnetic and electrical energy with solenoids connected in series, according to embodiments of the invention and is depicted as reference character 300. FIG. 3B is a plan view of a hybrid system for harvesting magnetic and electrical energy with solenoids connected in parallel, according to embodiments of the invention and is depicted as reference character 350. For ease of viewing specific component orientations and connections, permanent magnets 104A, B, and C (shown in FIG. 1) and central longitudinal axes 106A, B, and C (shown in FIG. 1) are not shown in FIG. 3A or 3B.

Referring simultaneously to FIGS. 1 through 3B, embodiments of the invention can take several formats. In embodiments, the substrate 102 is an insole of a shoe. The substrate 102 may also be a sole or part of a sole of a shoe, including the heel portion. A person having ordinary skill in the art will recognize that an insole is sometimes referred to as an insert.

In embodiments, the substrate 102 may also be referred to as a platform without detracting from the merits or generality of embodiments of the invention. The substrate 102 exhibits appropriate rigidity and cushioning capability, based on application-specific conditions, necessary for a user's shoe/boot.

In embodiments, a person having ordinary skill in the art will recognize that the term permanent magnet is a material exhibiting a persistent magnetic field even without the application of external energy.

In embodiments, energy harvested from the apparatus 100 can be stored in devices capable of storing electrical charge such as, for example, batteries and capacitors.

In embodiments, the coil of wire 108A, B, and C is at least one solenoid. As shown in FIG. 3A, each coil of wire 108A, B, and C is connected in series to increase voltage output. As shown in FIG. 3B, each coil of wire 108A, B, and C is connected in parallel to increase current output.

In embodiments, the energy harvesting device is configured to fit within the confines of a shoe. Thus, the apparatus can be built into a sole.

In embodiments, the energy harvesting device is configured to removably fit within a shoe. Thus, the apparatus 100 can be retrofitted as an insole that can be placed into an existing shoe.

In embodiments, the magnet 104A, B, and C (FIG. 1) is configured to move laterally along the central longitudinal axis 106A, B, and C (FIG. 1) when a compressive force (not shown) is applied to the substrate 102 (FIGS. 1, 3A, and 3B). FIG. 2A depicts lateral movement 202A and 202B along the central longitudinal axis 106A associated with permanent magnet 104A. Lateral movement corresponds to alternating current (AC) power. An example of lateral movement would include back 202A (FIG. 2A) and forth 202B (FIG. 2B) movement during compression (downward force applied) and decompression (removal of the force), respectively.

In embodiments, the magnet 104A, B, and C (FIG. 1) is configured to rotationally spin about the central longitudinal axis 106A, B, and C (FIG. 1) when a compressive force (not shown) is applied to the substrate 102 (FIGS. 1, 3A, and 3B). Rotation can be either synchronous or staggered. FIG. 2B depicts rotational spin 252 about the central longitudinal axis 106A associated with permanent magnet 104A. Rotational spin corresponds to direct current (DC) power. A rotational spin example would include clockwise rotation during compression and counterclockwise rotation during decompression.

Since magnetic fields are additive, the magnetic field of the apparatus 100 is maximized when all magnets 104A, B, and C move laterally or rotate. Although, embodiments of the invention do allow for some magnets to move laterally and others to rotate. However, independent systems such as, for example, an alternator are needed in such cases.

The solenoids 108A, B, and C (FIGS. 1, 3A, and B) ideally span the entire length of the substrate 102 (FIGS. 1, 3A, and B). A reason for this not to occur is to allow room for a mechanism that would allow for the magnets 104A, B, and C to move either laterally or rotationally. Additionally, the span of the solenoids 108A, B, and C can be limited in cases where all the energy generation is localized in the heel.

In embodiments, the magnets 104A, B, and C are selected from the group of rare earth elements such as, for example, neodymium and europium. The solenoids 108A, B, and C are conductive materials having a zero or low energy band gap between valence and conduction bands. Metals and metal oxides are suitable materials having a zero energy band gap (0 eV). Semiconductors are suitable materials having a low energy band gap, defined as greater than 0 eV and less than 1.2 eV. Band gap energy closer to 0 eV results in less charge loss.

Since the power generation/output is proportional to the density of the coil 108A, B, and C and strength of the permanent magnet 104A, B, and C, the solenoid/magnet placement/number should be such that the maximum allowable space of the substrate 102 (sole/insert) is filled.

The solenoids 108A, B, and C are a succession of tightly wound coils of wires. Within these coils 108A, B, and C and along the central longitudinal axis 106A, B, and C is where the permanent magnet 104A, B, and C resides. A person having ordinary skill in the art will recognize that, according to the Right Hand rule, current is generated whenever there is a change in the magnetic field within the solenoid 108A, B, and C so either or both parts (magnet 104A, B, and C/solenoid 108A, B, and C) can move. In practice, it is more feasible for the solenoid 108A, B, and C to be the stationary component and the magnet 104A, B, and C to be the mobile component. Because of the perturbation of the magnetic field, any movement, either laterally or rotationally will induce a current.

Depending on application specific conditions and power requirements, the solenoids 108A, B, and C can either be interconnected in a series or parallel. Changing the configuration allows for the increase of either voltage or current output, depending on the application.

In embodiments, the energy to drive the magnet's rotation is provided by the force exerted by a heel step. Vertical displacements can be readily converted to rotational energy. A person having ordinary skill in the art will recognize that an Archimede's screw is one such method. By varying the number of rotations per distance unit, each heel step can translate to dozens of rotations along the screw axis.

One having ordinary skill in the art will recognize that the apparatus 100 can be used with a shoe, boot, slipper, or any durable apparel item fitted to a human foot, without detracting from the merits or generality of embodiments of the invention. Furthermore, the concepts embodied herein are equally applicable to other species that can make use of durable wear items fitted to their feet. Further research includes, but is not limited to, identifying alternative mechanisms for the translational and rotational movement of the magnets 104A, B, and C.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An energy harvesting device, comprising:
   a substrate;
   at least one permanent magnet configured to fit in said substrate, wherein each of said at least one permanent magnet has a central longitudinal axis; and
   at least one coil of wire equal in number to said at least one permanent magnet, wherein each of said at least one coil of wire is configured to fit circumferentially around each of said at least one permanent magnet, wherein each of said at least one coil of wire is configured to fit in said substrate.

2. The energy harvesting device according to claim 1, wherein said substrate is an insole.

3. The energy harvesting device according to claim 1, wherein said at least one coil of wire is at least one solenoid.

4. The energy harvesting device according to claim 1, wherein each of said at least one coil of wire is connected in series to increase voltage output.

5. The energy harvesting device according to claim 1, wherein each of said at least one coil of wire is connected in parallel to increase current output.

6. The energy harvesting device according to claim 1, wherein said energy harvesting device is configured to fit within the confines of a shoe.

7. The energy harvesting device according to claim 1, wherein said energy harvesting device is configured to removably fit within a shoe.

8. The energy harvesting device according to claim 1, wherein said magnet is configured to move laterally along said central longitudinal axis when a compressive force is applied to said substrate.

9. The energy harvesting device according to claim 1, wherein said magnet is configured to rotationally spin about said central longitudinal axis when a compressive force is applied to said substrate.

10. A method of making an energy harvesting device, comprising:
    providing a substrate;
    providing at least one permanent magnet having a central longitudinal axis, wherein each of said at least one permanent magnet has a central longitudinal axis;
    providing at least one coil of wire equal in number to said at least one permanent magnet, wherein each of said at least one coil of wire is configured to fit circumferentially around each of said at least one permanent magnet, wherein each of said at least one coil of wire is configured to fit in said substrate;
    positioning and attaching each of said at least one permanent magnet in said substrate; and
    circumferentially fitting each of said at least one coil of wire around each of said at least one permanent magnet and attaching each of said at least one coil of wire to said substrate.

11. The method according to claim 10, wherein said substrate is an insole.

12. The method according to claim 10, wherein said at least one coil of wire is at least one solenoid.

13. The method according to claim 10, further comprising connecting each of said at least one coil of wire in series to increase voltage output.

14. The method according to claim 10, further comprising connecting each of said at least one coil of wire in parallel to increase current output.

15. The method according to claim 10, further comprising fitting said energy harvesting device within the confines of a shoe.

16. The method according to claim 10, further comprising removably fitting said energy harvesting device within a shoe.

17. The method according to claim 10, further comprising configuring said magnet to move laterally along said central longitudinal axis when a compressive force is applied to said substrate.

18. The method according to claim 10, further comprising configuring said magnet to rotationally spin about said central longitudinal axis when a compressive force is applied to said substrate.

* * * * *